US007752439B2

(12) United States Patent  
Basibes et al.

(10) Patent No.: US 7,752,439 B2  
(45) Date of Patent: *Jul. 6, 2010

(54) METHOD AND APPARATUS FOR PROVIDING PROCESS-BASED ACCESS CONTROLS ON COMPUTER RESOURCES

(75) Inventors: Mounir Emil Basibes, Austin, TX (US); Julianne Frances Haugh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 212 days.

This patent is subject to a terminal disclaimer.

(21) Appl. No.: 12/025,867

(22) Filed: Feb. 5, 2008

(65) Prior Publication Data

US 2008/0289034 A1 Nov. 20, 2008

Related U.S. Application Data

(63) Continuation of application No. 10/672,261, filed on Sep. 25, 2003, now Pat. No. 7,392,383.

(51) Int. Cl.
*H04L 9/00* (2006.01)
*G06F 21/00* (2006.01)

(52) U.S. Cl. .................... 713/167; 713/185; 726/5; 726/19

(58) Field of Classification Search ................ None
See application file for complete search history.

(56) References Cited

U.S. PATENT DOCUMENTS 4,135,240 A 1/1979 Ritchie
5,321,841 A 6/1994 East et al.
5,867,646 A 2/1999 Benson et al.
6,044,373 A 3/2000 Gladney et al.
6,308,181 B1 10/2001 Jarvis (Continued)

OTHER PUBLICATIONS

"Extensive Access Control List Mechanism", IBM Technical Disclosure Bulletin, Dec. 1991, pp. 114-117, vol. 34 No. 7B, IBM Corporation.

(Continued)

*Primary Examiner*—Gilberto Barron, Jr.
*Assistant Examiner*—Simon Kanaan
(74) *Attorney, Agent, or Firm*—Yee & Associates, P.C.; Matthew W. Baca (57) ABSTRACT

A method, apparatus, and computer instructions for process-based access controls on computer resources to processes. An access mechanism is provided in which a specific invoker obtains an object access identity (ACI). Another mechanism is provided in which a specific object, such as a file system resource, requires a specific object access identity to obtain one of the forms of access denoted by an access control list. A process may "grant" an identifier that is later "required" for a system resource access. Objects may specify their own access requirements and permitted access modes. The granted identifier, ACI, is stored in the process's credentials once these credentials match a specific "grant" entry in the access control list. This identifier has no meaning outside of being used to make an access decision for a specific resource. When a process tries to access the object, the object's access control list is scanned for "required" entries. If a match occurs between the "required" entry's identifier and the ACI stored, access to the object is granted with access rights specified in the "require" entries.

18 Claims, 5 Drawing Sheets

U.S. PATENT DOCUMENTS

| | | | |
|---|---|---|---|
| 6,412,070 | B1 | 6/2002 | Van Dyke et al. |
| 6,438,549 | B1 | 8/2002 | Aldred et al. |
| 6,453,353 | B1 | 9/2002 | Win et al. |
| 7,302,706 | B1 * | 11/2007 | Hicks et al. .................. 726/24 |
| 2001/0056494 | A1 | 12/2001 | Trabelsi |
| 2002/0077803 | A1 | 6/2002 | Kudoh et al. |
| 2003/0105796 | A1 | 6/2003 | Sandri et al. |
| 2003/0154397 | A1 | 8/2003 | Larsen |

OTHER PUBLICATIONS

"Enhanceable Authorization Mechanism", IBM Technical Disclosure Bulletin, Jun. 1987, pp. 179-181, vol. 30 No. 1, IBM Corporation.

Ott et al., "The 'Rule Set Based Acess Control' (RSBAC) Framework for Linux", pp. 1-18. http://www.rsbac.org/doc/media/rsbac-framework.pdf.

Blakley et al., "Access Control Model for LDAP", ACL Model: Internet Draft, Mar. 1998, pp. 1-31.

* cited by examiner

```
402 ── create_new_user:           404
  406 ── group:administrators:grant_oai:create_new_user
  408 ── user:root:grant_oai:create_new_user
                                   404
428 ── admin_change_password:
  430 ── group:administrators:grant_oai:admin_change_password
  432 ── user:root:grant_oai:admin_change_password
  434 ── user:security_admin:grant_oai:admin_change_password
                      414      416
410 ── user_list_file:
  412 ── require_oai:create_new_user:read,write 426 ── user_password_file:
       require_oai:create_new_user:read,write
       require_oai:admin_change_password:read,write
       require_oai:view_password_status:read
                        436
418 ── /home:
  420 ── require_oai:create_new_user:append ── 424

438 ── remove_user:      422
       use:root:grant_oai:remove_user
       group:administrators:grant_oai:remove_user 440 ── manage_batch_jobs:
  442 ── user:root:grant_oai:manage_batch_jobs
  444 ── user:batch_admin:grant_oai:manage_batch_jobs
       require_oai:remove_user:allow:execute ── 446
       require_oai:remove_user:grant_oai:remove_batch_jobs
                                              448
```

```
602 ~ file1:
            user:read,write
            group:read
            others:
     600 ~ SID7:read
606 ~ program2:
            user:read,execute
            group:read,execute
            others:
     604 ~ group:security:SetSID 13
610 ~ program3:
            user:read,execute
            group:read,execute
            other:read,execute
     608 ~ SID10:SetSID 11
612 ~ admin_tool:
            user:read,execute
            group:read,execute
            others:read,execute
     614 ~ SID10:SetSID 100
     616 ~ group:security:SetSID 200
     618 ~ group:printers:SetSID 300
     620 ~ group:disks:SetSID 400

622 / user_admin:
     628 / SID200:SetSID 210

624 / printer_admin:
     630 / SID300:SetSID 310

626 / disk_admin:
     632 / SID400:SetSID 410

634 / create_directory:
     638 / SID210:allow:execute
     640 / SID310:allow:execute 636 / create_device:
     642 / SID310:allow:execute
     644 / SID410:allow:execute
```

*FIG. 6*

```
900 ~ /home
            user:read,write,create,delete
            group:read,write,search
            others:read,search
     902 ~ SID230:delete
     904 ~ SID210:create 906 / /user/spool/batch
            user:read,write,create,delete
            group:read,write,search
            others:read,search
     908 / SID510:read,search
     910 / SID520:delete
     912 / SID521:delete
```

METHOD AND APPARATUS FOR PROVIDING PROCESS-BASED ACCESS CONTROLS ON COMPUTER RESOURCES

This application is a continuation of application Ser. No. 10/672,261, filed Sep. 25, 2003 now U.S. Pat. No. 7,392,383, status allowed.

BACKGROUND OF THE INVENTION

1. Technical Field

The present invention relates generally to an improved data processing system and in particular to an improved data processing system having multiple processes and multiple resources. Still more particularly, the present invention provides a method, apparatus, and computer instructions for providing process-based access controls on multiple computer resources to multiple processes.

2. Description of Related Art

As computer systems become increasingly complex, the task of managing access to various system resources also becomes more difficult. System resources involved are not only limited to common shared file and program data. Resources such as network printers and physical memory also are shared among multiple processes on multiple systems. Control mechanisms are needed to ensure the resource access types, such as the form of access being requested. These accesses include, for example: read a file, write a file, bind a shared memory segment, and opening a device. Furthermore, control mechanisms that prevent propagation of enhanced privileges or access rights also are needed.

Various approaches to solve the problem of process-based access controls have been proposed. One access control system uses a set user identification bit (SUID) to change the effective user ID from the actual user to the owner of the executable file. As a result, during the execution of the program, the current user appears to be the owner of the executable file and all the data files accessible by the owner of the executable file are accessible to the program. However, this SUID exposes a potential security flaw and privilege leak. Since the SUID has meaning outside of the applications subsystem, the SUID can grant more privileges than an ordinary user may require. In addition, a privilege leak may occur when a program, granted root access, inadvertently executes another program, which results in a security violation.

Another proposed solution to solve the process-based access controls problem is called a Flask/Fluke concept. This concept uses an object manager to enforce security policy decisions on objects. A security policy labels the object with a set of security attributes called security context, which consists of attributes such as: user identity, classification level, and role. In one example implementation of Flask/Fluke, a process manager is responsible for ensuring each process is securely initialized. However, the process manager provides support for fork and execve operations, which means the security ID may be changed through an execve operation. In addition, Flask/Fluke lacks the ability to selectively alter the capabilities of the process based on the identity of the invoker or the path by which the process came to be executed.

Therefore, it would be advantageous to have an improved method, apparatus, and computer instructions for providing process-based access controls on computer resources by creating an identifier that has no meaning outside of the application, has no meaning if a given system resource that has not requested that specific identifier is required, and has a limited potential for security exposures. Moreover, it would be advantages to have a mechanism that provides a level of granularity to ensure that system resource access and corresponding access rights are limited a specific application.

SUMMARY OF THE INVENTION

The present invention provides an improved method, apparatus, and computer instructions for process-based access controls on computer resources to processes. An access mechanism is provided in which this mechanism indicates that a specific invoker obtains an object access identity. Another mechanism is provided in which a specific object, such as a file system resource, requires a specific object access identity to obtain one of the forms of access denoted by an access control list. A process may "grant" an identifier that is later "required" for a specific form of system resource access. Each object may specify its own access requirements and permitted modes of access. The granted identifier, object access identifier, is stored in the process's credentials once these credentials match a specific "grant" entry in the access control list. This identifier has no meaning outside of being used to make an access decision for a specific resource. When a process tries to access the object (system resource), the object's access control list is scanned for "required" entries. If a match occurs between the "required" entry's identifier and the object access identifier stored in the process's credentials, access to the object is granted with access rights specified in the "require" entries. The capabilities of a process may be selectively altered based on either the identity of the invoker or the path by which the process came to be executed. A process may obtain information of the execution path by which processes are executed and may convey the execution path information to the subsequent trusted processes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
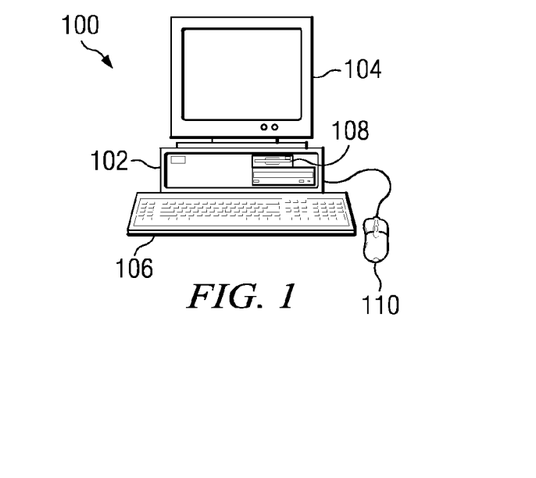
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
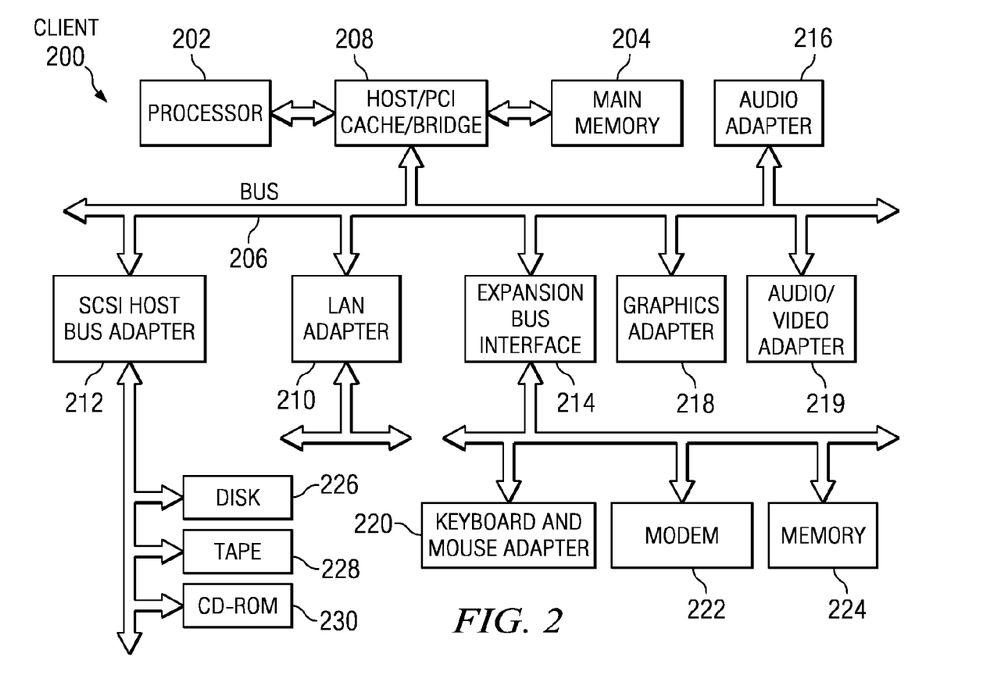
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method, apparatus, and computer instructions for managing process-based access controls on computer resources by providing a mechanism for creating identifiers, which are usable in the system resource access decision to determine a specific type of access. The identifier created by the mechanism of the present invention has no meaning outside of the file access decision in these examples. In addition, the identifier created has no meaning if a system resource has not requested it to be required.

Currently, if the identifier is a set user identification bit (SUID), the identifier may be reused by other applications. The SUID is assigned to be the owner of the executable file. Since the SUID has meaning outside the application space, another application may use the same SUID to access resources that it should not be allowed to access.

On the other hand, if the identifier has process capabilities such as a privilege to be the root process, this privilege enables a process to have access rights to other processes and resources, which violate the access control policy. The violation occurs because a given resource has not requested the identifier to be required. Therefore, by using the identifier created using the present invention, the scope for system resource access is limited and security exposures are greatly reduced, as compared to a SUID.

The mechanism of the present invention also introduces an access control list facility that allows a process to "grant" an identifier that is later "required" to access a specific system resource. The identifier of the present invention may be granted by any of the existing access checking mechanisms. For example, a user, a group or a combination of a user and a group. The identifier may be added to a process's credentials only if the process executes specific binary that contains an entry granting the identifier. Once a process grants an identifier, that identifier is no longer available to other processes. From a security standpoint, this identifier is not reused. In this manner, each state within a number of possible execution states is uniquely identifiable. If an unrelated execution path exists, the identifiers may be reused such that the intersection of the two sets of identifiers and their execution pathway are empty.

In one example, the mechanism of the present invention indicates a specific invoker obtains an object access identity (OAI) and a specific object or resource requires a specific OAI in order to obtain one form of access denoted in the access control list (ACL).

Figure 3:
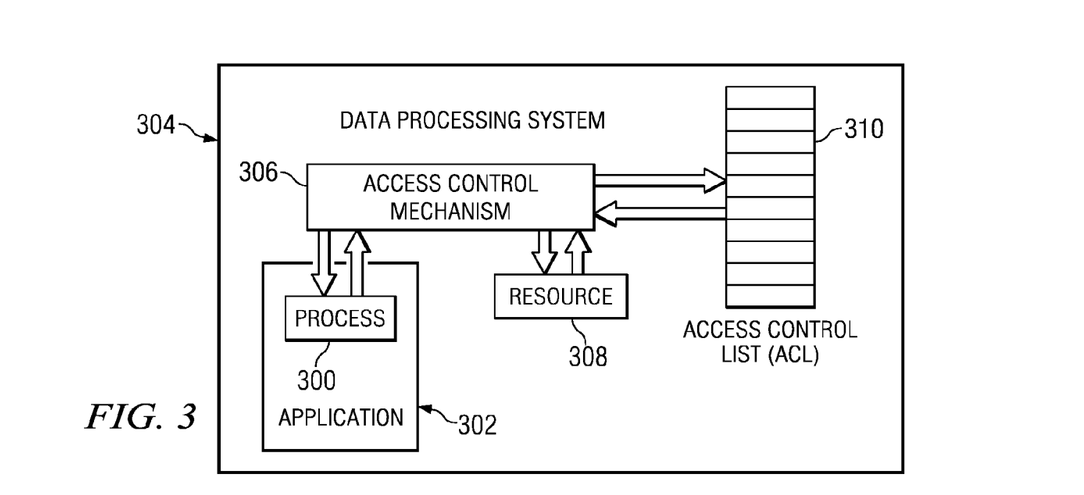
FIG. 3 is a diagram illustrating components used in providing process-based controls on computer resources in accordance with a preferred embodiment of the present invention.

Turning now to FIG. 3, a diagram illustrating components used in providing process-based controls on computer resources is depicted in accordance with a preferred embodiment of the present invention. As depicted in FIG. 3, in this example implementation, process 300 may be executed by application 302 within data processing system 304. This data processing system may be implemented using data processing system 200 described in FIG. 2. Access control mechanism 306 of the present invention allows process 300 to grant an identifier to access a specific system resource, such as resource 308, by matching a "grant" entry in the access control list (ACL) 310 to the process's 300 credentials when the resource 308 having the ACL 310 is executed. The identifier granted in the ACL 310 is added to the credentials or process 300. This identifier is now called object access identifier (OAI) and OAI has no meaning outside of the application 302.

Once the identifier is granted, access control mechanism 306 of the present invention then determines whether to grant access to resource 308 by scanning ACL 310 of the resource that has the grant entry for "require" entries. If the "require" entry in the ACL 310 of the resource has a matching OAI that corresponds to the OAI in the process's 300 credentials, access to the resource 308 is granted to the process 300 for the given access rights specified in the "required" entry in the ACL 310.

Figure 4:
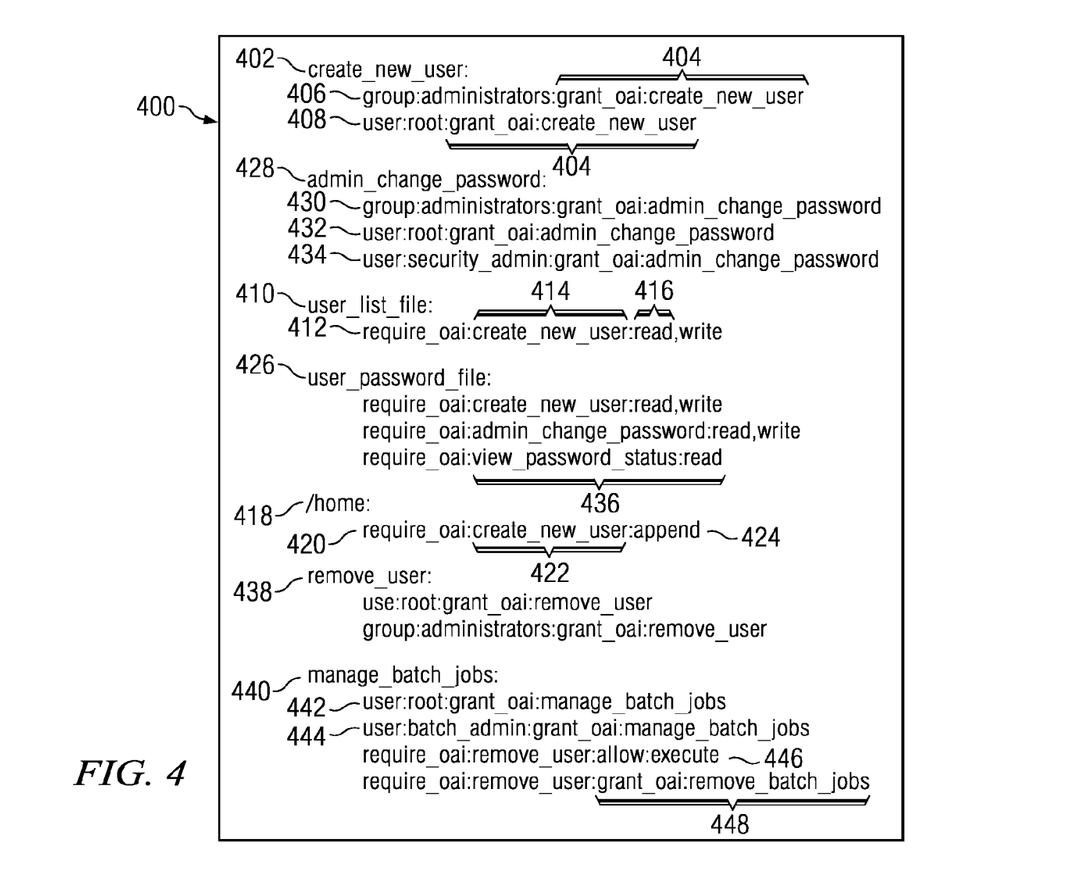
FIG. 4 is a diagram illustrating entries of an OAI in the ACL for the processes (subjects) and resources (objects) in accordance with a preferred embodiment of the present invention.

Turning next to FIG. 4, a diagram illustrating entries of an OAI in the ACL for the processes (subjects) and resources (objects) is depicted in accordance with a preferred embodiment of the present invention. As depicted in FIG. 4, in this example implementation, within ACL 400, subject "create_new_user" 402 contains "grant_oai" entries 404 with "group:administrators" 406 and "user:root" 408 as the access checking mechanism. Entries with the form "user:<username>" and "group:<groupname>", for example "group:administrators" 406 and "user:root" 408 in this case, causes the remainder of the entry to be performed if the username is contained within the process's credentials set.

Also in ACL 400, object "user_list_file" 410 contains a "require_oai" entry 412 that has prefix "require_oai:<identifier>", in this example "required_oai:create_new_user" 414. This entry, "required_oai:create_new_user" 414, causes the remainder of the entry to be performed if identifier is contained within the process's credentials set of OAI. In this example, using the mechanism of the present invention, each object may specify its own access requirements and permitted modes of access, for example "read" 416 access. In addition, the enumeration of object accesses by a given subject can lend itself readily to the enumeration of "require" entries for each target entry. For example, if the "create_new_user" process creates a new home directory for newly created user in the "/home" file system 418, "require_oai" entry 420 may be added to the ACL, granting any process with "create_new_user" 422 identity to have the access right "append" 424 to add a new directory.

In another example implementation illustrated in FIG. 4, three processes may be present: "create_new_user" 402, "admin_change_password" 428 and "view_password_status" 436. In this example, "create_new_user" 402 is a process that may be executed by system group "administrators" 406 or system user "root" 408. "create_new_user" 402 has to be able to update file resources "user_list_file" 410 and "user_password_file" 426.

On the other hand, "admin_change_password" process 428 may be executed by member of system group "administrators" 430, system users "root" 432 or system user "security_admin" 434. "view_password_status" 436 is a process that may be executed by any system user to allow the user to view protected information about their password. "view_password_status" 436 is a process that may contain logic required to determine the invoking user. Therefore, "view_password_status" 436 is assigned read access to the "user_password_file" 426.

Also depicted in FIG. 4, in this example of implementation, are two processes "remove_user" 438 and "manage_batch_jobs" 440. "manage_batch_jobs" 440 may be executed by system user "root" 442 and "batch_admin" 444 as well as any process that has the identifier "remove_user" 438. Permission suffixes, in this case "allow:execute" 446, is defined for a current set of access rights in the operating system such as the AIX operating system, a product by International Business Machine Corporation. However, the permission suffixes are not limited to the above set of access rights of a particular operating system.

The "allow:execute" 446 suffix has a different set of identifiers from the previous entries because this difference may be useful if the batch job directory requires one object identifier for creating entries, for example the "append" 424 permission described above for "/home" 418 file directory. In addition, the mechanism of the present invention provides the ability to modify the credentials of the process by using "grant_oai:<identifier>" suffix, for example "grant_oai:remove_batch_jobs" suffix 448. This suffix modifies the credentials of "remove_user" 438 by granting "remove_batch_jobs" as an OAI of "remove_user" 438. The <identifier> used in this example implementation is not related to either the file owner or the file group identifier and is not dependent upon the ability of the process to execute the object.

Figure 5:
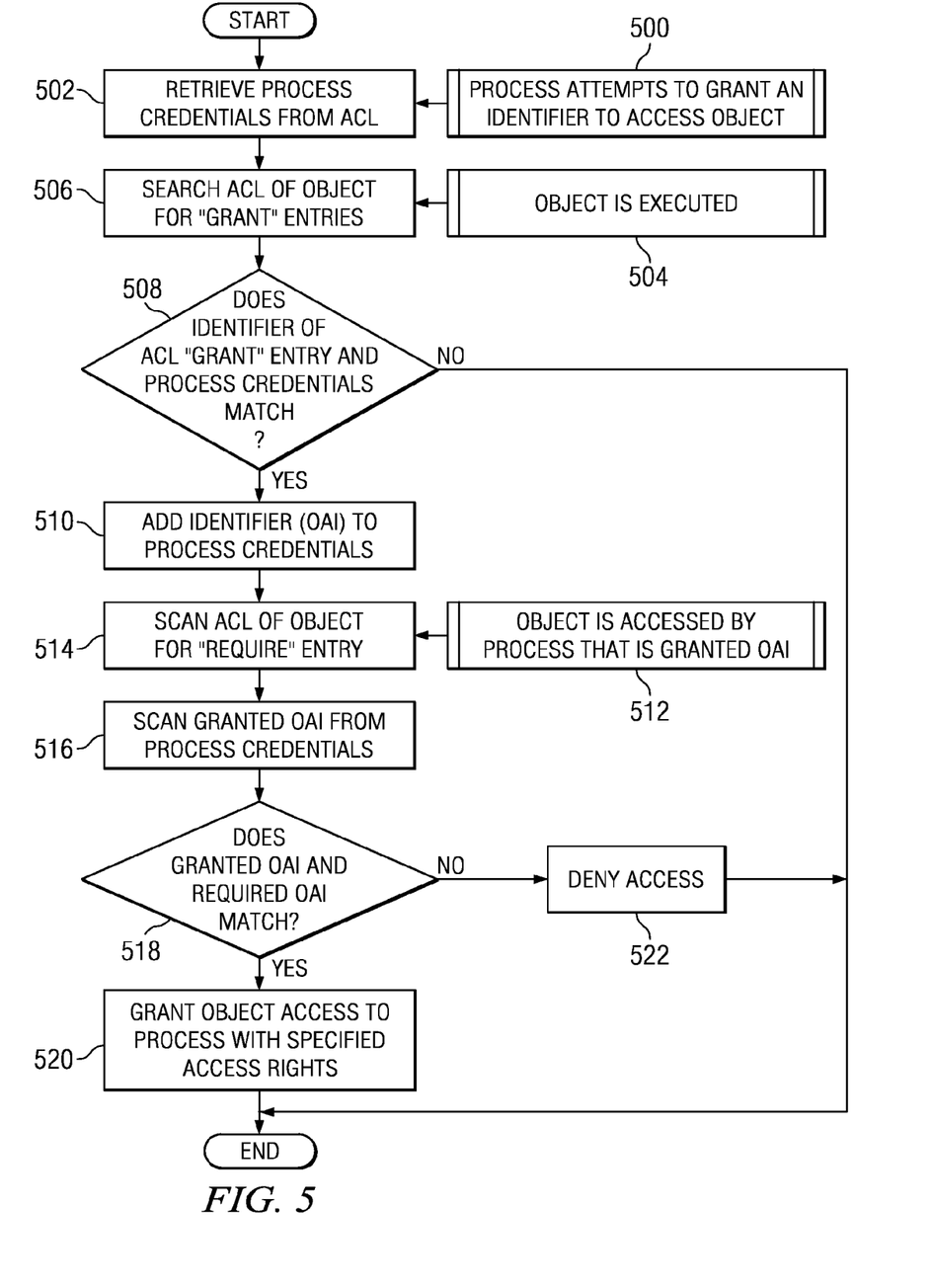
FIG. 5 is a flowchart of a process used in providing process-based access controls on computer resources in accordance with a preferred embodiment of the present invention.

Turning next to FIG. 5, a flowchart of a process used in providing process-based access controls on computer resources is depicted in accordance with a preferred embodiment of the present invention. The process illustrated in FIG. 5 may be implemented in a process in a data processing system, such as the data processing system 200 described in FIG. 2.

As depicted in FIG. 5, from the access control mechanism's perspective, the process begins when a process attempts to grant an identifier to access a specific system resource (step 500). The current process's credentials are retrieved from ACL for comparison (step 502). When the object having the ACL is executed (step 504), the ACL is searched for entries that have "grant_oai" type (step 506).

Once an "grant_oai" entry is located, for example: "user:root: grant_oai:create_new_user" entry 408 in FIG. 4, the identifier of the "grant_oai" entry, in this case "create_new_user", is matched against the process credentials. A determination is made as to whether the credentials match the values in the ACL (step 508). If a match occurs, the identifier given in the ACL is added to the process credentials as object access identifier (OAI) (step 510). If a match does not occur, the process terminates thereafter.

After an identifier is granted to the process credentials in step 510, the object may be accessed by the process with the granted OAI (step 512). An access determination process then takes place to scan the ACL of the desired object for entries that has "require_oai" type (step 514). Next, the granted OAIs are scanned (step 516) in the process credentials when a "require_oai" entry is found.

A determination is then made as to whether the granted OAI from the process credentials matches the required OAI in the ACL (step 518). If a match occurs, the desired object is granted for access by the current process with specified access rights in the ACL (step 520) with the process terminating thereafter. If a match does not occur, access is denied (step 522) with the process terminating thereafter.

Figure 6:
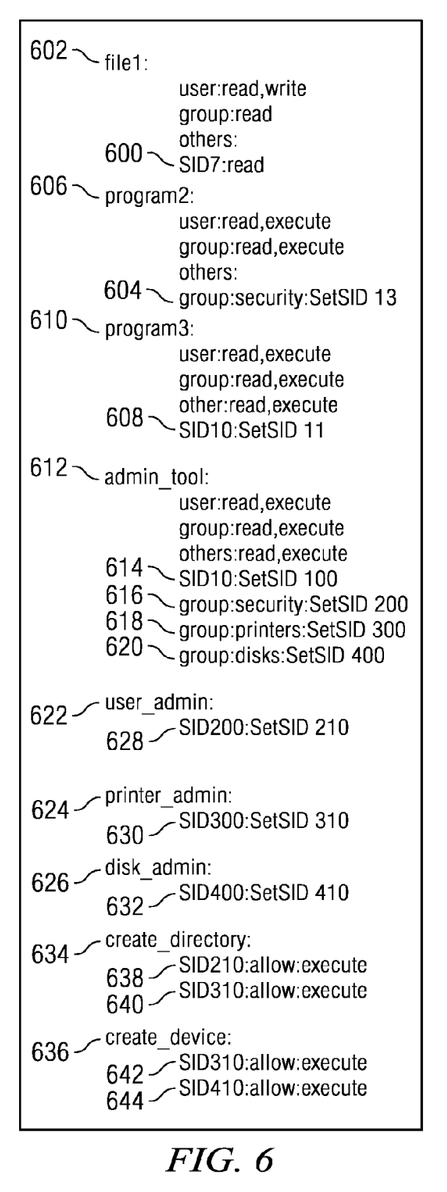
FIG. 6 is a diagram illustrating entries of OAI's in the ACL for another example implementation in accordance with a preferred embodiment of the present invention.

Turning now to FIG. 6, a diagram illustrating entries of OAI's in the ACL for another example implementation is depicted in accordance with a preferred embodiment of the present invention. As depicted in FIG. 6, in this example implementation, ACL is a list of access rights granted or denied based on the identities. ACL consists of one or more entries and the entries are in a form of a pair as follows: identity, rights values. A security identifier (SID) is used as a meaningless arbitrary identifier for making access decisions. The SID may either be an identity or a right. The SID may be changed through a program execution through a SetSID operation in the ACL entry. Like previous example implementation, the SID may be required as an identifier in the ACL.

For example, a process with SID7 600 is granted "read" access to file1 602. In this case, the SID is an identity. The SID is granted by using a SetSID operation. For example, SetSID operation grants SID13 604 to members of system group "security" when program2 606 is executed. In addition, a granted SID may be changed to a new SID within an ACL entry. For example, a process with a SID of 10 has its SID changed to 11 608 when program3 610 is executed. In this case, the SID of 11 is a right.

Also shown in FIG. 6, an SID may be granted based on the identity of the program invoker such as the user, group, or SID identity. For example, a tool named "admin_tool" 612, with an SID of 10 is changed to a new SID of 100 614, system group "security" is granted with SID of 200 616, system group "printers" is granted with SID of 300 618, system group "disks" is granted with a SID of 400 620.

Three other tools of this example: user_admin 622, printer_admin 624 and disk_admin 626 may determine its path of execution by examining its SID. This is another innovative feature of the present invention since no existing prior art may selectively alter the capabilities of a process based on the identity of the invoker. In this example, user_admin 622 changes a process with a SID of 200 to a SID of 210 628, printer_admin 624 changes a process with SID 300 to a SID 310 630 and disk_admin 626 changes a process with SID 400 to a SID 410 632.

From the above assignment, the other tools such as create_directory 634 and create_device 636 may determine its own execution path only allowing a certain process with a particular SID to execute. For example, create_directory 634 only allows a process with SID 210 638 and SID 310 640 to execute and create_device 636 only allows a process with SID 310 642 and SID 410 644 to execute.

From the above example, create_directory 634 tool may only be executed through the path: admin_tool 612, user_admin 622, create_directory 634 or another path: admin_tool 612, printer_admin 624, create_directory 634. Next, the tool create_device 636, is similar to create_directory 634 and may only be executed through the path: admin_tool 612, printer_admin 624, create_device 636 or another path: admin_tool 612, disk_admin 626, create_device 636.

Figure 7:
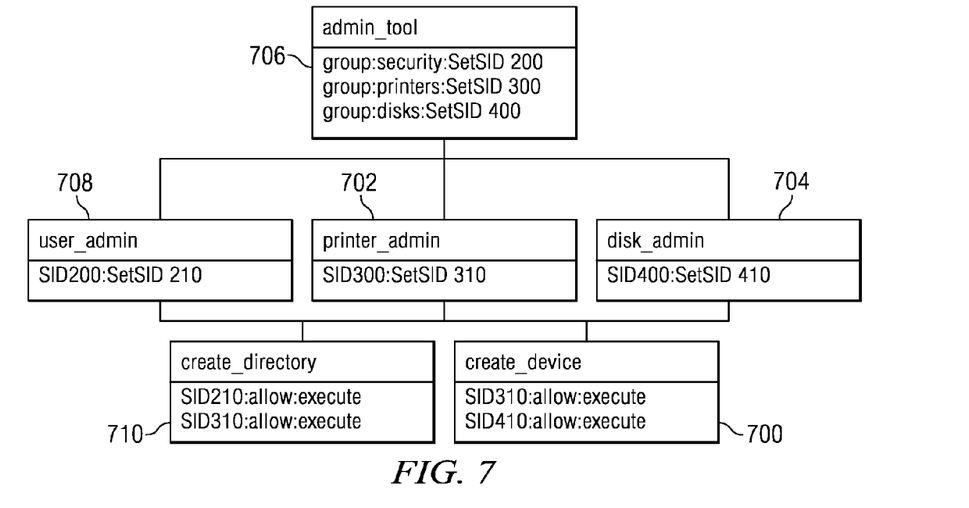
FIG. 7 is a diagram illustrating of execution paths for tools in accordance with a preferred embodiment of the present invention.

Turning now to FIG. 7, a diagram illustrating of execution paths for tools described in FIG. 6 is depicted in accordance with a preferred embodiment of the present invention. As depicted in the illustration example in FIG. 7, the tool, create_device 700, may only be executed by a process which is granted the correct SID. In this example, the process is printer_admin 702 or disk_admin 704. These two tools may only be executed by admin_tool 706. By using the mechanism of the present invention, path of execution for processes may be tracked and access rights may be granted based on the history of execution. The security identifier (SID) represents paths of execution since an ACL entry may grant a different SID based on the path taken by having different SIDs representing different paths. For example, a path from admin_tool 706 to user_admin 708 may be marked by SID 210 or a path from admin_tool 706 to printer_admin 702 may be marked by SID 310.

Therefore, a tool may know its path of execution by examining its SID and determining from which identity is the current program being invoked. In this example, create_directory 710 knows it may be invoked by user_admin 708 after admin_tool 706 by examining SID 210 and create_directory 710 also knows it may be invoked by printer_admin 702 after admin_tool 706 by examining SID 310. As illustrated in the above example, the SID only has meaning when defined and appeared in an ACL; therefore, SID has no intrinsic meaning outside of the ACL.

Figure 8:
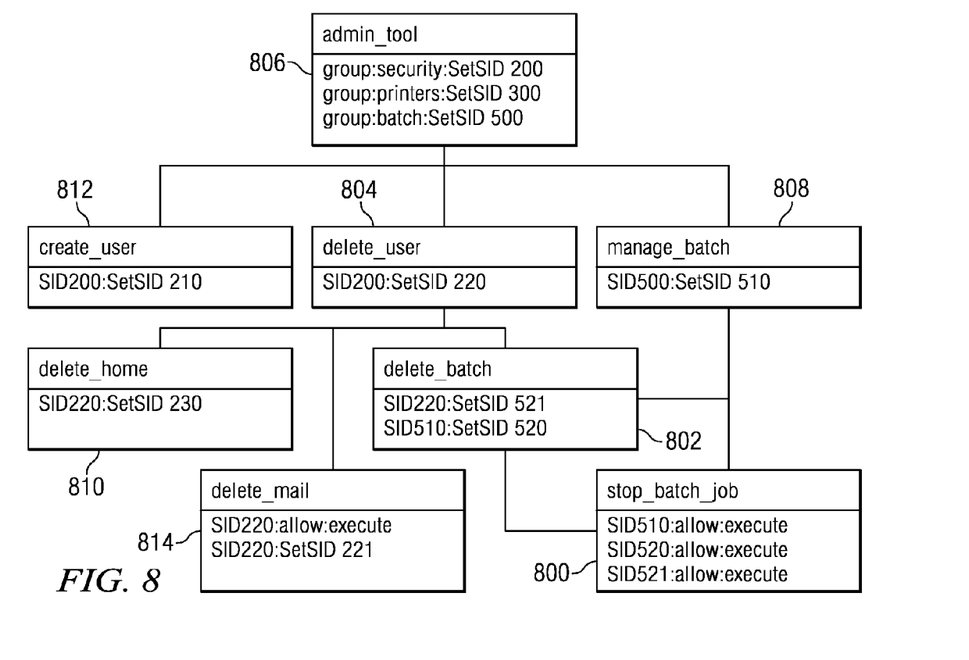
FIG. 8 is a diagram illustrating execution paths of another example implementation of the present invention in accordance with a preferred embodiment of the present invention.

Turning next to FIG. 8, a diagram illustrating execution paths of another example implementation of the present invention is depicted in accordance with a preferred embodiment of the present invention. As depicted in FIG. 8, paths of execution may become arbitrarily complex, limited by the number of possible SID values. For example, tool stop_batch_job 800 may examine SID 521 and knows its path of execution from delete_batch 802, which changes SID 220 to SID 521, and from delete_user 804, which changes SID 200 to SID 220, and ultimately from admin_tool 806, which grants system group "security" an SID of 200. This path includes four levels of execution and the path already has involved three different SIDs. If other paths continue to surface as accesses are granted through other tools, the complexity and the number of SID values may continue to increase.

Figure 9:
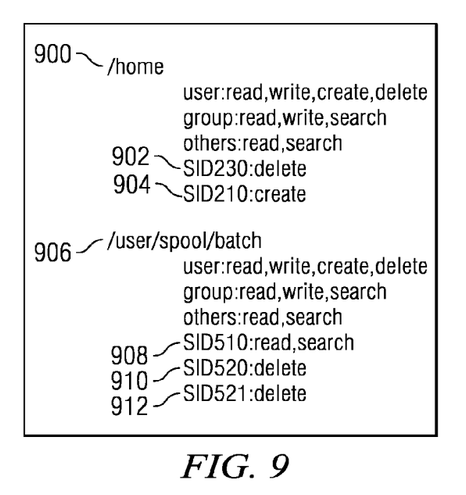
FIG. 9 is a diagram of entries in the ACL for file permission of tools in accordance with a preferred embodiment of the present invention.

Finally, turning to FIG. 9, a diagram of entries in the ACL for file permission of tools described in FIG. 8 is depicted in accordance with a preferred embodiment of the present invention. As depicted in FIG. 8, file permission may be implemented by using SID values, which allow programs to have extra access rights based on its execution path. For example, a user directory named /home 900 is a parent directory when a user is created or deleted, /home 900 allows delete_home program 810 in FIG. 8 to have "delete" access by examining its SID of 230 902, since delete_home 810 is in the execution path. /home 900 also allows create_user program 812 to have "create" access after examining SID 210 904, since create_user 812 is in the execution path.

Also depicted in FIG. 9, /user/spool/batch 906 is a directory, in this example, where the batch jobs are stored. File permission "read" and "search" access is allowed for manage_batch 808 by examining SID 510 908 so that manage_batch 808 program in FIG. 8 can examine the directory when managing the batch job. /user/spool/batch 906 further allows delete_batch 802 invoked by manage_batch 808 through examining SID 520 910 to have "delete" access as one execution path; and allows delete_batch 802 invoked by delete_user 804 to have "delete" access through examining SID 521 912 as the other execution path. As a result, file permission controls are better managed by identifying paths of execution using the above mechanism of the present invention.

Thus, the present invention provides an improved method, apparatus, and computer instruction for providing process-based controls on computer resources to multiple processes. The mechanism of the present invention solves the problem of potentially granting more privilege than a user may require by limiting the scope of the identifier to only within the application space. So that the identifier is only meaningful when the object resource has requested the identifier to be required. Moreover, the identifier is not propagated during the fork/execve operations; therefore, the security policy may be violated.

In addition, the mechanism of the present invention allows process credentials to be modified based on the identity of the invoker or the path by which the process came to be executed. This mechanism enables a process to obtain information of the execution path by which processes are executed and enables a process to convey the execution path information to the subsequent trusted processes.

Furthermore, using the innovative features of the present invention, an object or resource may specify its own access requirements and permitted modes of access. Hence, propagation of access rights or privileges is prevented by specifying access rights, such as read or write, to be limited to a specific application.

It is important to note that while the present invention has been described in the context of a fully functioning data processing system, those of ordinary skill in the art will appreciate that the processes of the present invention are capable of being distributed in the form of a computer readable medium of instructions, a variety of forms, and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for managing access to resources, the data processing system comprising:
   a bus system;
   a memory connected to the bus system, wherein the memory includes a set of instructions; and
   a processing unit connected to the bus system, wherein the processing unit executes the set of instructions to grant a security identifier given by an access control list to a process in response to matching an entry in the access control list of a specific resource with credentials of the process, wherein the security identifier has no meaning outside of being used to make an access decision for the specific resource, and wherein granting the security identifier further comprises:
   adding the security identifier to the credentials of the process to form an object access identifier, wherein the object access identifier is granted based on a path of execution;
   limiting a scope of the security identifier to an application space, wherein access rights associated with the security identifier are limited to a specific application, and wherein propagation of access rights is prevented by specifying the access rights are limited to the specific application; and
   identifying the security identifier as an unavailable security identifier that is no longer available to be granted to other processes in response to granting the security identifier to the process, wherein the security identifier is not reused; and
   to generate the access decision based on the security identifier in response to the process requesting access to the specific resource.

2. The data processing system of claim 1, wherein granting the security identifier further comprises:
   adding the security identifier to the credentials of the process to form an object access identifier, wherein the object access identifier is granted based on an identity of the process and a second process invoked by the process, and wherein the credentials of the process are modified based on the identity of the process and path of execution by which the process is executed.

3. The data processing system of claim 1, wherein granting the security identifier includes:
   setting the security identifier in an access control list operation.

4. The data processing system of claim 1,
   wherein the processing unit executes a further set of instructions to change the security identifier in response to the process invoking a selected resource.

5. The data processing system of claim 1, wherein generating the security identifier includes:
   using the security identifier as an identity in an access control list to identify a right to the specific resource.

6. The data processing system of claim 1, wherein the security identifier is a right in an access control list.

7. The data processing system of claim 1, wherein the security identifier uniquely identifies the path of execution taken by the process, and wherein the processing unit executes a further set of instructions to grant a different security identifier to the process based on a different path of execution taken by the process, and wherein each security identifier granted to the process represents a different path of execution taken by the process.

8. The data processing system of claim 7, wherein the processing unit executes a further set of instructions to examine a plurality of security identifiers added to the credentials of the process to uniquely identify execution states associated with the process.

9. The data processing system of claim 1, wherein the processing unit executes a further set of instructions to track paths of execution for the process using security identifiers added to the credentials of the process to form execution path information; and convey the execution path information to a subsequent trusted process.

10. A computer program product in a non-transitory computer readable medium in a data processing system for managing access to resources, the computer program product comprising:
   instructions for granting a security identifier given by an access control list to a process in response to matching an entry in the access control list of a specific resource with credentials of the process, wherein the security identifier has no meaning outside of being used to make an access decision for the specific resource, wherein the instructions for granting the security identifier further comprises:
      instructions for adding the security identifier to the credentials of the process to form an object access identifier, wherein the object access identifier is granted based on a path of execution;
   instructions for limiting a scope of the security identifier to an application space, wherein access rights associated with the security identifier are limited to a specific application, and wherein propagation of access rights is prevented by specifying the access rights are limited to the specific application; and
   instructions for identifying the security identifier as an unavailable security identifier that is no longer available to be granted to other processes in response to granting the security identifier to the process, wherein the security identifier is not reused; and
   instructions responsive to the process requesting access to the specific resource, for generating the access decision based on the security identifier.

11. The computer program product of claim 10, wherein the first instructions further comprises:
   sub-instructions for adding the security identifier to the credentials of the process to form an object access identifier, wherein the object access identifier is granted based on an identity of the process and a second process invoked by the process, wherein the credentials of the process are modified based on the identity of the process and the path of execution by which the process is executed.

12. The computer program product of claim 10, wherein the first instructions includes:
   sub-instructions for setting the security identifier in an access control list operation.

13. The computer program product of claim 10 further comprising:
   instructions for changing the security identifier in response to the process invoking a selected resource.

14. The computer program product of claim 10, wherein the second instructions includes:
   sub-instructions for using the security identifier as an identity in an access control list to identify a right to the specific resource.

15. The computer program product of claim 10, wherein the security identifier is a right in an access control list.

16. The computer program product of claim 10, wherein the security identifier uniquely identifies the path of execution taken by the process and further comprising:
   instructions for granting a different security identifier to the process based on a different path of execution taken by the process, wherein each security identifier granted to the process represents a different path of execution taken by the process.

17. The computer program product of claim 16 further comprising:
   instructions for examining a plurality of security identifiers added to the credentials of the process to uniquely identify execution states associated with the process.

18. The computer program product of claim 10 further comprising:
   instructions for tracking paths of execution for the process using security identifiers added to the credentials of the process to form execution path information; and
   instructions for conveying the execution path information to a subsequent trusted process.

* * * * *